J. H. BAIR.
FLUID POWER TRANSMISSION APPARATUS.
APPLICATION FILED JULY 1, 1916.

1,423,386.

Patented July 18, 1922.
4 SHEETS—SHEET 1.

Inventor
Joseph H. Bair
By
Attorneys

J. H. BAIR.
FLUID POWER TRANSMISSION APPARATUS.
APPLICATION FILED JULY 1, 1916.

1,423,386. Patented July 18, 1922.

Inventor
Joseph H. Bair
By
Attorneys

UNITED STATES PATENT OFFICE.

JOSEPH H. BAIR, OF PHILADELPHIA, PENNSYLVANIA, ASSIGNOR OF EIGHTEEN-SIXTIETHS TO JAMES O. DAVID, OF PHILADELPHIA, PENNSYLVANIA, FIFTEEN-SIXTIETHS TO HERVEY S. KNIGHT, OF CHICAGO, ILLINOIS, AND TEN-SIXTIETHS TO LEWIS H. TAYLOR, JR., OF PHILADELPHIA, PENNSYLVANIA.

FLUID POWER-TRANSMISSION APPARATUS.

1,423,386.              Specification of Letters Patent.       Patented July 18, 1922.

Application filed July 1, 1916. Serial No. 107,211.

*To all whom it may concern:*

Be it known that I, JOSEPH H. BAIR, a citizen of the United States, residing at Philadelphia, in the State of Pennsylvania, have invented certain new and useful Improvements in Fluid Power-Transmission Apparatus, of which the following is a specification.

This invention relates to an organization of mechanical elements for use in establishing a system of power transmission, employing fluid as the transmitting medium; also to the construction of such mechanical elements per se; and particularly to a system, the elements of which are a pump adapted to be actuated from any suitable source of power, one or more fluid driven motors, pipes connecting the pump with the motors, and, for some purposes, controllable valve or valves for reversing and otherwise directing and for throttling the flow of transmission fluid through the pipes.

The primary object of the invention is to provide an organization of elements in such a system as above described, which will insure a higher degree of flexibility and a greater degree of efficiency in the transmission and distribution of power from a prime mover to a point or points of consumption, than have heretofore been attainable with transmission systems of this type.

According to the preferred method of realizing these objects, the pump receives power directly from the prime mover as by having the pump shaft directly connected with the power shaft of the prime mover, so that the pump shaft has a speed commensurate with and directly determined by the speed of the prime mover. But where the prime mover, particularly if it be an internal combustion engine, is connected directly with a power-transmission system, it is impossible to vary the speed of the prime mover without sacrificing its efficiency sufficiently to meet the requirements of flexibility in speed of the ultimate machine to be driven, for example a motor vehicle, and accordingly it has heretofore been the practice to introduce various mechanical means for varying the ratio of transmission from the prime mover. This, however, involves the use of mechanism which is not only vulnerable, but expensive in its consumption of power. One feature of the present invention, therefore, consists in eliminating variable mechanical connections between the prime mover and the transmission system, and substituting in lieu thereof, means for varying the capacity of the pump itself from zero speed with infinite power, up to maximum speed with proportionately reduced power, but in every grading of transmission, delivering the whole output of the pump to the fluid-driven elements, as distinguished from maintaining high capacity of pump and by-passing or wasting a part of the output; and a subordinate feature having to do with this phase of the invention consists in determining the capacity of the pump by the length of its pumping stroke; also developing the pump stroke through means of an eccentric having means for varying its eccentricity at will; while still further features in this connection, reside in the particular mechanism employed for shifting the eccentric relatively to its center of revolution, whereby the adjustments may be made with a minimum expenditure of force, and the parts are caused to retain their positions of adjustment with a minimum tendency to move toward less efficient position.

The further improvements include power transmission at minimum loss; substantially continuous torque delivered by the fluid motor; the output control of the pump and the fluid control between the pump and the motor, the latter including suitable arrangements for using the motor as a brake, a pressure equalizer in the line between the pump and the motor; and arrangements in the fluid motor construction which provide for the differential rotation of the vehicle driving wheels. All of these features are fully described hereafter in detail and illustrated in the accompanying drawings, in which:

Figure 2ª is a view similar to Figure 2 showing in larger scale the fluid connections between the pump and the motor.

Figure 2ᵇ is a still larger sectional view of the portion J and adjacent connections in Figure 2ª on the line 2ᵇ—2ᵇ in Figure 4ª.

Figure 4ª is an enlarged sectional view of the central portion of Figure 4.

Figure 5ª is an enlarged sectional view of the valve U and its adjacent elements shown in Figure 5.

Briefly enumerated, the elements that enter into the system here employed for illustration, are as follows:—D is an automobile of any desired type; E, a prime mover thereon; F, the pump; and G, the open tank for expansion of the fluid, separation of its impurities, etc. H is the pressure conduit part in which are the control valve; I, the fluid-driven motors; and J, the differential fluid feed. K is a fan on the pump shaft; S, the steer wheel; T, the equalizer in the open tank; and U, the timing valves keyed to the respective shafts. V represents the eccentrics that actuate the pump pistons; W, the motor crank shafts actuated by the fluid motor pistons, during driving, but imparting reciprocation to the motor pistons when, in coasting, the fluid motors act as pumps; and X represents the double-headed pistons of both pump and motors.

Referring now more fully to the functions of the several elements enumerated, and to their preferred details of construction which better adapt them to serve their intended purposes, the engine E (Figures 1, 2 and 3), as prime mover, drives pump F through the medium of the common shaft 1, which forms a flexible connection between them by means of universal joints 2 and intervening telescoping parts on said shaft. Pump F sucks the liquid from open tank G and propels it rearward through a channel made up of pressure pipe 54, pipe 50, pipe 44 and pipe 43, whence it enters the forked part 40, constituting the differential fluid feed J; proceeds through the timing valves U (Figure 4); and reaches the pistons X in motors I, through the ports 34, 35, 36 and 37 in proper sequence, as hereinafter more fully described. The fluid exhausts back through the same ports 34, 35, 36 and 37, in proper sequence, as they are successively in communication with the outer spaces of the distributing or timing valves U, through outer channel 41 of differential duct J, and escapes thence through pipe 45, past valve 46, through duct 47, past valve 77, and through return channel 78 to the open tank G.

The pistons of pump F, like the engine E, always run in the same direction. To reverse the motors, their port connections serving normally for intake and outlet must be interchanged in their connections with pressure pipe 54 and open tank G. This is accomplished by a lever 61, held by spring 60, which, when pulled up at the forward or handle end, pushes down at the rear or weight end, a plunger 59 which operates a plunger valve 77 and registers the ports in the required manner, so that the liquid in the pressure pipe 54 now passes to the motors through a passageway composed of ports 57 and 48 duct 47, valve 70, pipe 45, outer differential pipe 42, differential space 41, and outer valve spaces 17, and acts upon the pistons at times, determined by the valves, that cause backward running of the crank shafts W; and this fluid returns through the inside cavity 13 of valve U (Figure 8), differential passage 44, duct 50, valve 77, and duct 53, port 58, duct 78, to open tank G.

Figure 24:
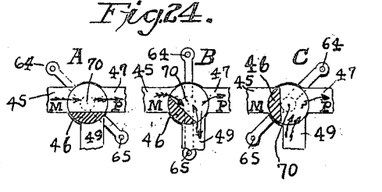
Figure 24 represents, by three positions A, B and C, the action of the short-circuiting and braking valve.

Braking is accomplished in the following manner. 70 is a valve in the valve part H located in the return pipe 47, at its intersection with a by-pass 49. This valve 70 normally remains in the position of the drawing, Figure 2, when not in braking service. Its several positions and relations to the pedals 66 and 67 which operate it, are shown in Figure 24. Position A with pedal 67 advanced and 66 retracted, is the normal forward driving or non-braking position. In this position, it closes the connection between the pressure pipe 50 and the return pipe 45, 47, possible by closing the by-pass 49.

In the second position B, representing one of many braking positions, both pedals 66 and 67 are held in some intermediate position represented by a more or less perpendicular position of the control arms 64 and 65, which are connected, respectively, to pedals 66 and 67 by pull rods 70' and 69.

In position C, the outlet-intake connection of the motors is entirely closed and all flow is blocked, and consequently the wheels cannot be budged and the car is locked. In this position with pedal 66 forward, the car can be locked by locking the pedal. In this position, the engine E can be run, since the flow of the pump is short circuited by means of pipe 49, now open. In this position, unauthorized moving of the car is impossible, either under its own power or by towing, for the rear wheels cannot be turned. A small short circuiting pipe (not shown in the drawing, (Figure 2) can be supplied, connecting pressure pipe 44 and return pipe 45, rearward of pipe 49 and similar to it but with a valve in it normally closed and locked. A duplicate key for this, furnished an attendant, will enable him to move the car slowly, when it is required to shift it about in the garage.

When braking valve 70 is in the normal forward driving position shown in A, of Figure 24, the short circuiting connection possible by pipe 49 is closed. In the position of B, both motors and pump are short circuited, and it may be seen by following the course of the fluid through the channels, already described, that whether driving forward or backward, or whether the engine and pump run or are stopped, there is no possible interference. Braking will not in any way interfere with the free running of the pump and its flow. Braking is positive and definite, whether there is pumping or not. When the brake valve 70 is in the position C, the engine can run, stop or start, as the pump flow is now fully short circuited.

Now assume that the pump F runs, going down a hill, pumping its maximum amount of oil and the braking valve 70 is in some position suggested by position B (Figure 24), part of the oil goes directly from the pump to the motor via the pressure route (already described) and returns via the return route, and part is directly short circuited via connecting pipe 49. Now in proportion, as return route 45 is blocked by means of the upward movement of the closure member 46 of valve 70, actuated by pedals 66 and 67, the short circuiting route (via pipe 49) for the pump is enlarged and more and more of the pressure medium of the pump goes via that short circuited route, and the speed of the car is proportionally blocked. When the closure member 46 of valve 70 is in the position C, all the flow is via the short circuit route by means of pipe 49 and the car stands still, and the engine may stand still or run, and the pump may make full strokes or any reduced stroke of its piston down to no stroke, or that resulting from concentric position of the eccentric.

Now should the driver either shut off the engine, or center the pump and throttle the engine, which is the expedient and economic thing to do when going down hill, then there is no flow on the pump side of the double-acting short circuit or by-pass. The rear wheels, under the momentum of the car and the grade acting through the medium of of the crank shaft, transform the motors into pumps, and the speed thereof is governed by the position of the closure member 46 of valve 70. In the 45° position, as shown in B, the maximum short circuiting flow may be attained, and consequently the minimum braking or maximum braking speed; that is the position in which the pedals 66 and 67 are exactly side by side. Advancing pedal 66 constricts pipe 45, checking the flow and consequently the speed of motors and car, until a standstill is reached in the position C, where pipe 45 is entirely closed.

Now another means of braking is expedient, i. e. by throttling the engine, and more or less concentering the pump eccentrics, so that the engine acts as a governor. To run more slowly requires nearer concentering, while to lock or stop the car instantly, merely requires complete centering of the pump.

Figure 1:
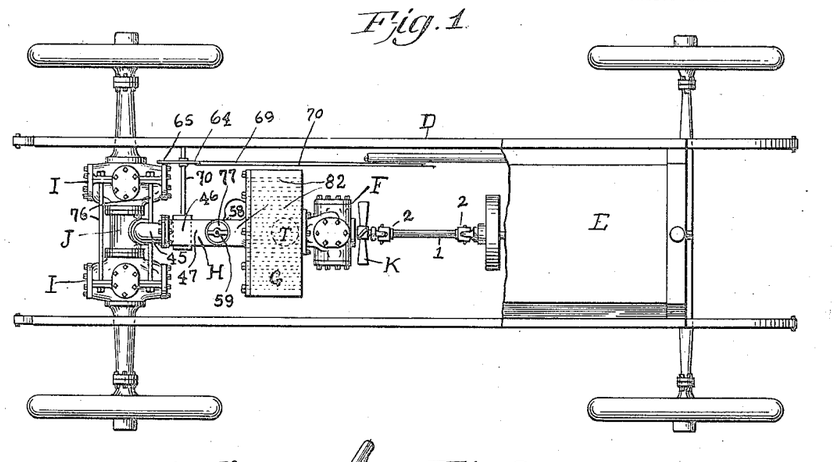
Figure 1 is a plan view of the chassis or running gear of an automobile, equipped with a fluid pressure transmission system, embodying the several features of the present invention.
Figure 2:
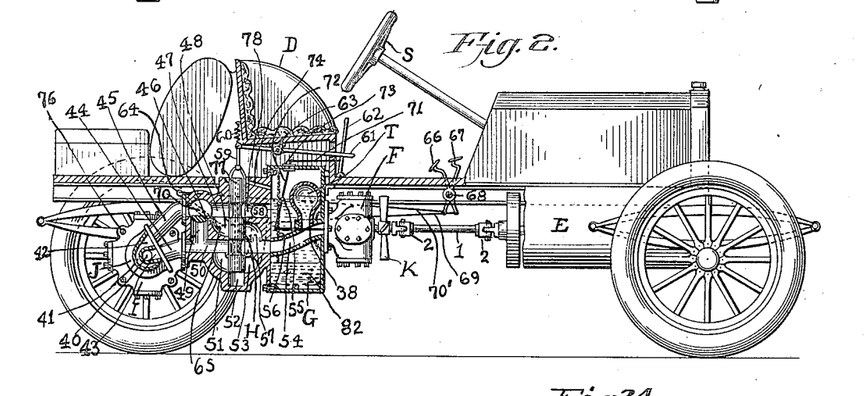
Figure 2 is a side elevation of an automobile having the system applied thereto, and partly in longitudinal section.
Figures 2A, 2B, 4A, 5A:
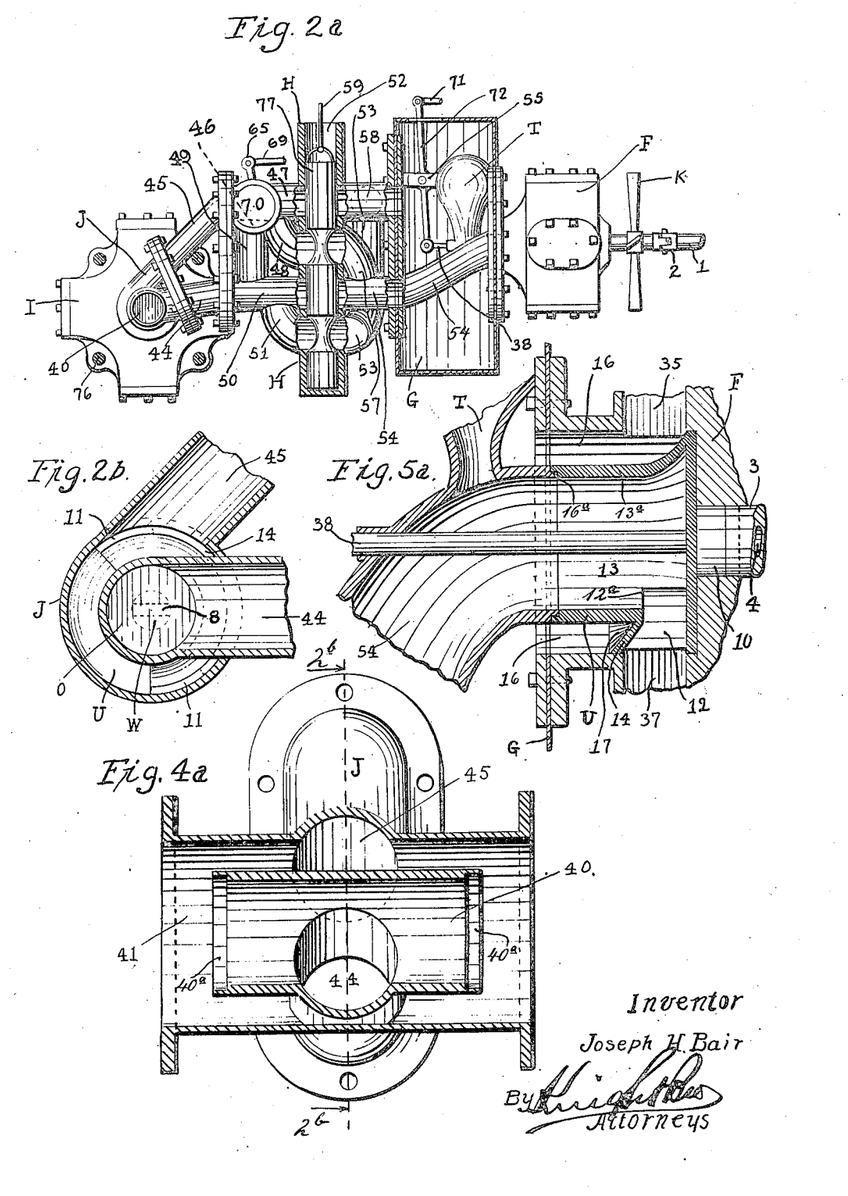
Figure 3:
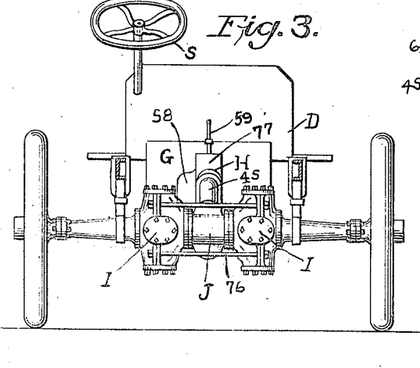
Figure 3 is a rear elevation of parts shown in Figures 1 and 2.
Figure 4:
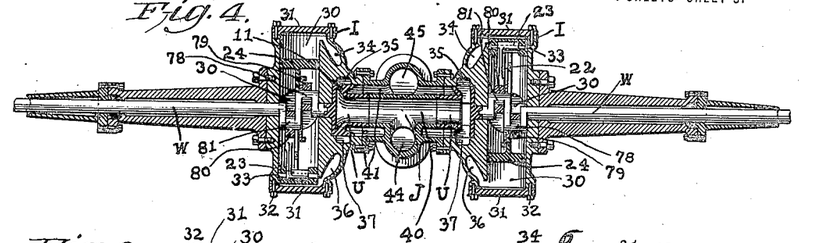
Figure 4 is a vertical axial section of the rear axles and their fluid motors, as seen when looking from front to rear.
Figures 5, 6, 7, 8, 9, 10, 11:
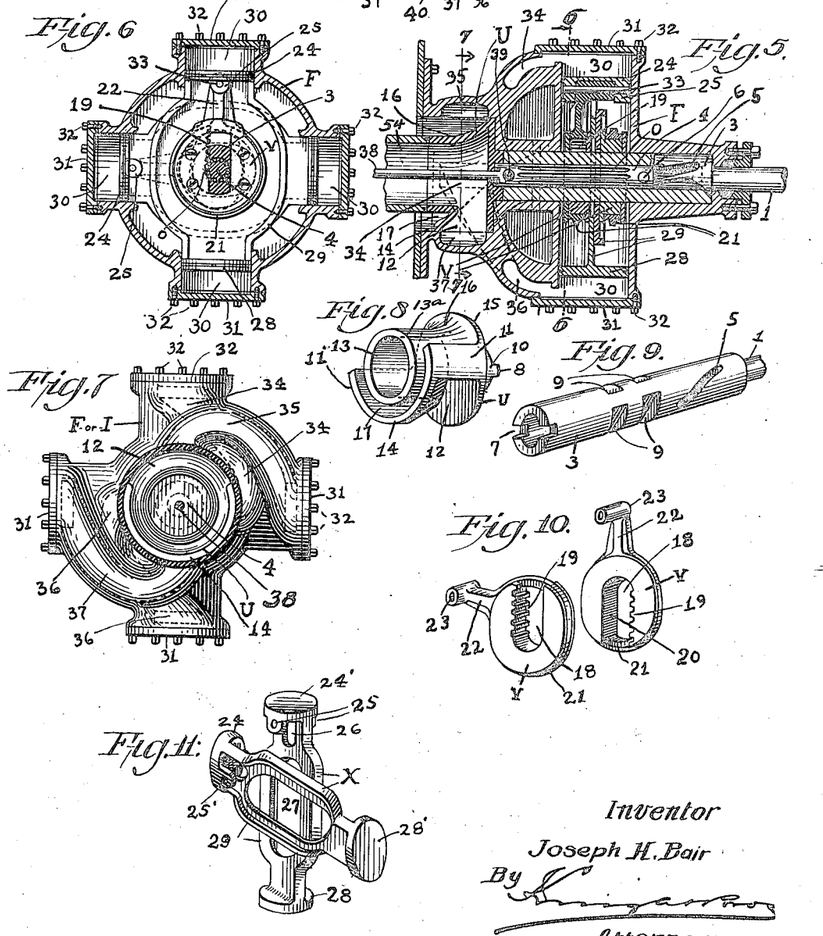
Figure 5 is an axial section through the fluid pump with its distributing valve and excentering mechanism.
Figure 6 is a transverse section of the pump on the line 6—6 of Figure 5.
Figure 7 is a transverse section on the line 7—7 of Figure 5.
Figure 8 is a detail perspective view of the distributing valve which serves for both the fluid pump and a fluid-driven motor.
Figure 9 is a detail perspective view of the tubular pump shaft.
Figure 10 shows, in segregated perspective views, the construction of the diametrically shiftable eccentrics and their straps by which they connect with the pistons.
Figure 11 is a perspective view of the two pairs of pistons in the positions relatively to each other, which they assume when in use.

To illustrate the principles embodied in the working of the motor, I make use of the schematic Figures 12 to 19 inclusive. I is the casing or shell of the motor having four radially disposed cylinders 30 (Figure 5). In these cylinders are two pairs of pistons X, having their respective opposed heads 24, 28 and 24', 28' connected by yokes in the form of webbed legs 29, between which are recesses 27, providing clearance for the crank shaft W (or, in the case of the pump, for eccentrics V). The pistons have clearance holes 26 for the bearing ends 23 of the straps 22 of the eccentrics in the pump, and similar clearances for bearing ends (not shown) of straps 79 and 80 (Figure 4) connecting the pistons with the respective wrist bearings 78 and 81 of crank shaft W in the fluid motors. Piston heads 24 and 24' have ears 25 and 25' receiving pins 33, by which to pivotally connect them, respectively, to the heads 23 of arms 22 on straps 21. The motors I are made in two parts, as shown in Figures 1, 2 and 3, and are held together by flange couplings 76 and by connecting rods 76'. The cylinder heads are covered by plates 31 and held by cap screws 32 (Figures 4, 5, 6 and 7).

The details of the valve U (whose function is shown in the schematic Figures 12 to 20) are shown in Figures 5, 5ª and 8. The end flange 15 has a bearing boss 10 on which is provided a lug 8 to couple it with shaft 3 of the pump (Figure 9), by means of notch 7, to cause its rotation with this shaft. The valves U of the motors I (Figure 4) are similarly constructed and coupled with their respective shafts W, so that the description of valve U with reference to Figures 5, 5ª and 8 equally applies to the valves U in Figure 4. Referring now again to Figures 5, 5ª and 8, from the main flange 15 projects, at right angles, the contracting tube 13ª which forms the discharge opening 13. In tube 13ª is provided a peripheral opening 12 which communicates with port 12 as shown in Figures 5ª and 8. From the same flange at its periphery and at right angles, project two closure faces 11 and 11' located diametrically opposite each other, and connected by the web-sector 14 which serves as a part of the partition between outlet 13 and intake 12. Between the inner tube part 16 and the partition sector 14 is an undercut 17 which prevents the outflow of oil into the outer valve chamber 41 (Figure 4) from being blocked or riffled by the rapidly revolving valve U. The effect of this construction is to provide, in a rotary valve, two circumferential ports, each approximating a semi-circumference, with longitudinal dividing segments 11, 11', and communicating with or merging into concentric inner and outer, circumferentially complete passages, with the outer passage separated from the port of the inner passage by means of the axially extending undercut flange 14 between segments 11, 11', and with the segments undercut on their sides next the outer passage port to avoid deflecting faces as far as practicable. As shown in Figure 5ª in detail, the tubular portion 13ª of valve U is jointed at its outer end to fluid duct 54 by a rabbeted joint 16ª which permits rotation of the valve and still affords a sufficient tight joint with this duct to prevent undue leakage of pressure fluid. Whatever fluid may escape at this point merely leaks into reservoir G, where it is taken up again by the pump so that this leakage is not lost from the system. In similar manner, the motor valves U in Figure 4 are joined to both ends of the fixed duct 40 by the rabbeted joints 40ª—40ª (see Figure 4ª), so that each of these motor valves can freely rotate with the crank shaft of its motor.

Coming now to Figures 12 to 20, representing in semi-diagrammatic fashion one of the motors, the closure members 11 and 11' of Figure 8 (shown as heavy black segments in Figures 12–20) are disposed at right angles to the crank pins 78 and 81 of the crank shaft W with the port 12, connecting the valve with the inner cavity 13 (which in this motor, for purposes of illustration may be assumed, the pressure cavity) forming, when best proportioned, three-eighths of the valve circumference, the closure or dividing members 11 and 11' each forming one-eighth the circumference, and the port 16, three-eighths of the circumference, and these ports being always in the same circumferential position relatively to the crank shaft W. Ports 35, 34, 37 and 36, respectively, enter the valve chamber at 90° apart and occupy, each, one-eighth of the circumference. Port 35 which enters the valve chamber of the motor at its uppermost position by an easy curve, connects it with the top (i. e. above the piston) of the right-hand horizontal cylinder (or piston chamber) 30. Port 34 entering valve chamber at the right, connects it with the top of the upper cylinder. Port 37 entering the valve chamber at the bottom, connects it with the top of the left hand horizontal cylinder, while port 36 entering the valve chamber at the left, connects it with the top (i. e. above the piston head of the lower inverted cylinder.

For the following explanation, it should be borne in mind that a pair of opposite pistons is fixed together as shown in Figure 11 in detail.

Figure 12:
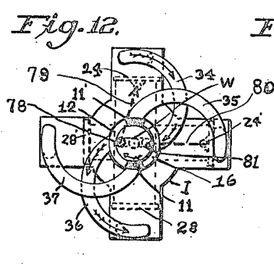
Figures 12 to 19 inclusive, represent more or less schematically, the action of the pump, or of a fluid motor, and the valve thereof, at the various phases that develop in a complete cycle of movements.
Figure 13:
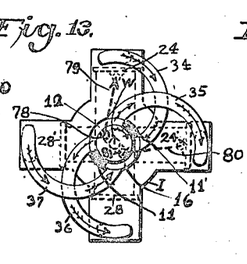
Figure 14:
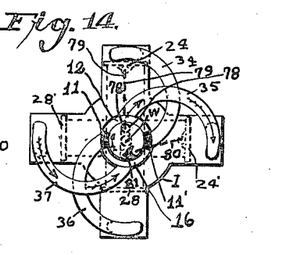
Figure 15:
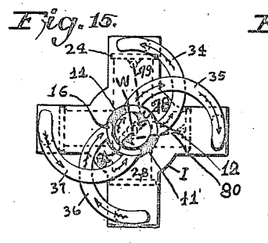
Figure 16:
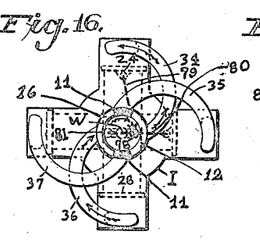
Figure 17:
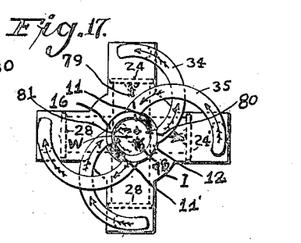
Figure 18:
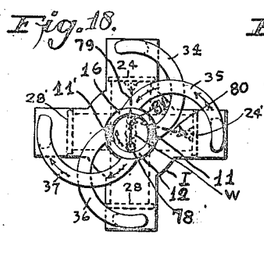
Figure 19:
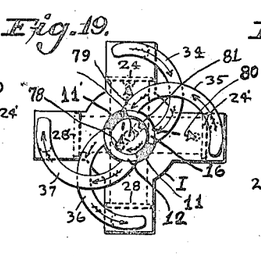

In the position shown in Figure 12, piston 24' is up and strap 80 is on high center, and the ports 35 and 37 are closed, respectively by closure members 11' and 11 of valve U. The oil flows out through port 36 into the lower inverted cylinder pressing on its piston head 28 and, correspondingly, piston head 24, by means of the strap 79 actuates the crank shaft at its crank pin 78, the crank standing then at right angles to the piston stroke. As the piston 24 moves up toward its cylinder head, its oil is exhausted through port 34 into the return port 16 of valve U. As the shaft is thus turned and the valve U with its ports 35 and 37 is opened gradually (Figure 13) and oil flows out through port 35, actuating the right hand horizontal piston 24' moving it in, and turning the shaft W by means of its crank pin 81 to which strap 80 is attached. As piston 24 moves in, its companion (opposite)

moves out and the oil in its chamber returns to the valve through port 37. The sum of the two pressures on crank shaft W by means of connecting rods 79 and 80 (in Figure 13) is equal the thrust of rod 79 during its tangential moment (shown in Figure 12) when the high and low center ports are closed. As the crank shaft and valve are driven still further around to position shown in Figure 14, the ports 34 and 36 are closed, their pistons representing the high and low centers, at this moment, and the strap 80 of the other pair of pistons, whose ports are now open, communicate with valve U, transmits the tangential pressure on the crank shaft W at pin 81. The arrows in each figure represent the direction of flow and of movement of thrust rods and crank shaft and valve respectively. Figures 12 to 19 inclusive represent one revolution of the crank shaft and valve, and by an examination of these figures in their order, the process is easily discerned.

Figure 20:
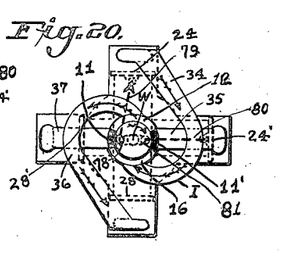
Figure 20 illustrates an alternative construction of parts shown in Figures 12 to 19.
Figure 23:
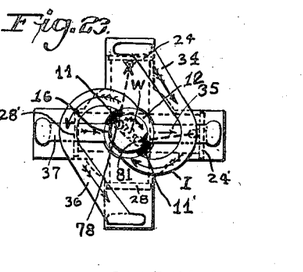
Figure 23 is a view similar to Figure 20, with the valve in a different position.

Figures 20 and 23 represent an alternative construction of ports 34, 35, 36 and 37, according to which two ports (35 and 37) are straight, and the alternate ones (34 and 36) are reversed. Figures 20 and 23 represent the first two of the eight steps of a revolution of the crank shaft shown in Figures 12 to 19 inclusive. In the latter construction, members 11 and 11' of the valve are in angular alinement with the crank pins 78 and 81 of shaft W instead of at right angles thereto.

Figures 21, 22:
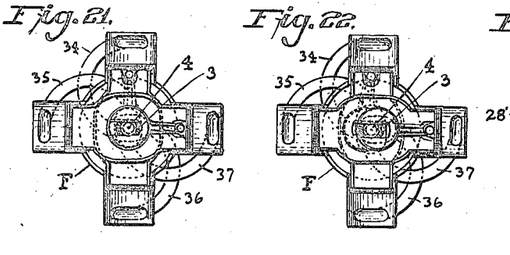
Figures 21 and 22 illustrate the eccentric shifting principle of the pump.

Figures 21 and 22 are auxiliary to Figures 5 and 6, in that they help illustrate the excentering-concentering principle of the pump which I shall now describe. The working of the pump is identical with that of the motors, except that shiftable eccentrics are substituted for a fixed thrust crank shaft.

Continuing from the engine E is shaft 1 (Figures 5, 6 and 9). In the pump, this shaft is enlarged into a tubular shell 3. Toward the engine end of the shell is a helical slot 5. In its middle are two pairs of parallel slots 9; at its end is a transverse slot. This tubular shaft has a clean concentric bore into which fits, snugly, a sliding pinion O, as shown in place in Figure 5. From this pinion projects, radially outward, a pin 6 that extends into the helical slot 5 of the tube 3. This pinion O is moved forward and backward in the tube by means of a thrust rod 38, which passes in through the valve U and has actuating connections through the open tank (Figures 2 and 2ª) by means of a lever 72 attached thereto at 56 and fulcrumed at pivot 55, and its free end is connected to an operating handle 62 by means of a link 71. By moving the handle 62 which is accessible to the chauffeur, forward or backward, the pinion O is slid in and outward in the tube 3 in line with its axis. The limit of the forward-backward excursion of the pinion O is the helical slot 5, in which the pin 6 of said pinion O rests. As the pinion slides, it is forced to turn by means of the pin in the slot.

Now the slots 9 form two opposed pairs of equal width, with parallel side faces, each in line with its opposed side face and perpendicular with the axis of the shaft, and with their respective bottom faces parallel, and parallel with the axial line of the shaft. The upper slot of the right hand pair and the lower slot of the left hand pair (of slots 9) have their bottom parallel faces tangent with the clearance hole for pinion O; and the lower slot of the right hand pair, and the upper slot of the left hand pair, (of slots 9) have their bottom faces in line with the bottom of the pinion teeth, so that the inserted pinion O in the tubular shaft 3 exposes the pinion teeth to their full depth on the one bottom of a pair of slots 9 and likewise on the opposite side of the other pair of slots.

Now into these slots, from opposite sides, are pushed the eccentrics V to engage their teeth 19 with those of the pinion projecting from the respective slots.

The eccentrics each have an elongated cutout 18, one wall of which, 20 is left plane, while into the opposite wall teeth 19 are cut of the same pitch as those in the pinion. To assemble the eccentrics in slots 9 of shaft 3 so as to mesh with pinion O, pin 6 is removed from the pinion. The straps 22, having an integral band 21 around the eccentric V, are removed from the eccentric by means of a plate on the side of the eccentric held by screws, as shown in Figure 6. When the parts are assembled, the pin 6 is again inserted into the pinion O through the helical slot 5.

Now it will be seen that by pushing the pinion O in by means of push rod 38, pinion O is compelled to turn relatively with the slot 5 and thus shift the eccentrics having their teeth in mesh with those of the pinion. This shifting is shown in Figures 21 and 22. In Figure 21, the pinion O is pulled back until the pin 6 reaches the valve end of the slot 5, when the eccentrics are concentric and the pump has no stroke. As pinion O is pushed in to the opposite limit, or the engine end of the slot 5, the eccentrics V are shifted to their extreme and the pump makes the maximum stroke.

Push rod 38 does not turn, but pinion O tied to shaft 3 by means of pin 6 in slot 5 turns with it, consequently the bearing points or contact ends of turning pinion O and stationary rod 38 must have provision to reduce friction of the thrust. This I procure by means of a bearing ball 39 which satisfactorily serves the purpose.

I claim:

1. In a fluid driving or driven apparatus, the combination of a shaft, an eccentric mounted on said shaft, a piston reciprocated by said eccentric, a housing for said piston, means for varying the eccentricity of the eccentric mounted coaxially with the shaft; said shaft having a bore which receives the varying means, and a transverse sector face intersecting said bore; said eccentric being fitted to said bearing face and constructed with a toothed rack presented to the bore of the shaft; and said varying means including a pinion within the bore and meshing with said rack.

2. The herein described shifting means for shaft eccentrics, comprising a hollow shaft, a pinion fitted therein, said shaft having two oppositely disposed transverse recesses, whose bottoms are parallel to each other, one of said bottoms intersecting with the bore of the shaft to permit the teeth of said pinion to protrude into its recess, and an eccentric mounted upon the shaft, with freedom of transverse movement in said recesses, and having an inwardly presented rack meshing with the pinion protruding through said recess.

3. The herein described shifting means for shaft eccentrics, comprising a hollow shaft, a pinion fitted therein, said shaft having two oppositely disposed transverse recesses, whose bottoms are parallel to each other, one of said bottoms intersecting with the bore of the shaft to permit the teeth of said pinion to protrude into its recess, and an eccentric mounted upon the shaft, with freedom of transverse movement in said recesses, and having an inwardly presented rack meshing with the pinion within the shaft; said pinion being axially extended and movable axially as well as rotatably in the bore, and having means developing rotary movement therein from its axial movement.

4. The herein described shifting means for shaft eccentrics, comprising a hollow shaft, a pinion fitted therein, said shaft having two oppositely disposed transverse recesses, whose bottoms are parallel to each other, one of said bottoms intersecting with the bore of the shaft to permit the teeth of said pinion to protrude into its recess, and an eccentric mounted upon the shaft, with freedom of transverse movement in said recess, and having an inwardly presented rack meshing with the pinion within the shaft; said pinion being axially extended and movable axially as well as rotatably in the bore, and having means developing rotary movement therein from its axial movement; said last named means comprising a pin and a helical slot, one carried by the wall of the shaft and the other by the pinion.

5. In a combination with a shaft having a bore and a pluralty of external transverse recesses intersecting said bore, eccentrics mounted upon said shaft with freedom of transverse movement in said recesses, and provided with toothed racks presented to the bore through said recesses, and a pinion located within the bore and meshing with said racks.

6. In a fluid driving or driven apparatus, a shaft, an eccentric suitably mounted upon said shaft to have freedom of transverse movement thereon, a piston actuated by said eccentric, a housing in which said piston works, a valve mounted coaxially with said shaft and directly coupled therewith, means for varying the eccentricity of the eccentric, and an operating connection for said varying means, extending from the outside through the valve to the shaft.

7. A rotary valve for fluid driving or driven mechanisms comprising a housing within which the valve rotates; having radial ports occupying segments of the same circumference of the valve; said valve having concentric circumferentially complete passages and with radially presented and circumferentially extending ports communicating therewith; the valve port communicating with the inner valve passages having an axially extending circumferential flange separating said port from the outer valve passage.

8. In a rotary valve for fluid driving or driven mechanisms, the combination of a shell, a rotary valve member fitted in said shell and having radially presented ports in the same circumference of the valve, with longitudinally extending separating segments of the circumference separating said ports; said valve having circumferentially complete concentric fluid passages merging with its ports; the port communicating with the inner passage being separated from the outer passage by a circumferential flange extending between the longitudinal segments, and the longitudinal segments being undercut at their ends adjacent the port which communicates with the outer concentric passage.

9. In a fluid driving or driven mechanism, an annular series of piston-chambers, located in pairs at opposite ends of a plurality of intersecting diameters, pistons working in the respective chambers, a shaft, driving connections between said shaft and all the pistons; the pistons of diametrically opposed chambers being rigidly connected together in pairs, whereby each serves as an aligning member for the other, and the aligning connections of the several pairs of pistons lying in different planes, whereby they are adapted to work past each other, the connections between the shaft and pistons comprising pitmen, and the aligning connections between each pair of pistons comprising a plurality of connecting yokes spaced apart to admit the shaft, and a pitman between them.

10. In a pressure fluid system of the character described, a fluid pump, a fluid motor and a pressure fluid conduit between the pump and the motor, mechanical means disposed inside of the pump for controlling its output, a fluid reservoir open to the atmosphere and surrounding said pressure fluid conduit and in suitable communication with said pump, said mechanical controlling means passing to the outside through the wall of said fluid conduit within the fluid contained in said reservoir to permit pressure fluid leakage to drain into said reservoir to be returned by said pump into the system.

11. In a pressure fluid system of the character described, a fluid pump, a fluid motor and a pressure fluid conduit between the pump and the motor, mechanical means disposed inside of the pump for controlling its output, a fluid reservoir open to the atmosphere and surrounding said pressure fluid conduit and in suitable communication with said pump, said mechanical controlling means having a hand controlled rod passing to the outside through the wall of said fluid conduit within the fluid contained in said reservoir to permit pressure fluid leakage to drain into said reservoir to be returned by said pump into the system.

The foregoing specification signed at Philadelphia, Pa., this 20th day of June, 1916.

JOSEPH H. BAIR.